US008555353B2

(12) United States Patent
Von Ahn et al.

(10) Patent No.: US 8,555,353 B2
(45) Date of Patent: Oct. 8, 2013

(54) METHODS AND APPARATUSES FOR CONTROLLING ACCESS TO COMPUTER SYSTEMS AND FOR ANNOTATING MEDIA FILES

(75) Inventors: Luis Von Ahn, Pittsburgh, PA (US); Manuel Blum, Pittsburgh, PA (US); Benjamin D. Maurer, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 981 days.

(21) Appl. No.: 12/524,149

(22) PCT Filed: Jan. 23, 2008

(86) PCT No.: PCT/US2008/000949
§ 371 (c)(1),
(2), (4) Date: Aug. 27, 2009

(87) PCT Pub. No.: WO2008/091675
PCT Pub. Date: Jul. 31, 2008

(65) Prior Publication Data
US 2010/0031330 A1 Feb. 4, 2010

Related U.S. Application Data

(60) Provisional application No. 60/881,962, filed on Jan. 23, 2007.

(51) Int. Cl.
G06F 21/00 (2013.01)

(52) U.S. Cl.
USPC .......................................................... 726/5

(58) Field of Classification Search
None
See application file for complete search history.

(56) References Cited

U.S. PATENT DOCUMENTS

| 5,347,628 A | 9/1994 | Brewer et al. |
| 6,195,698 B1 | 2/2001 | Lillibridge et al. |
| 6,278,455 B1 | 8/2001 | Baker |

(Continued)

FOREIGN PATENT DOCUMENTS

| JP | 2005-128820 A | 5/2005 |
| JP | 2005-322214 A | 11/2005 |

(Continued)

OTHER PUBLICATIONS

Extended European Search Report for EP Application No. 08713263.5, mailed Feb. 4, 2011, 9 pages.

(Continued)

*Primary Examiner* — Nadia Khoshnoodi

(57) ABSTRACT

Methods and apparatuses for controlling access to computer systems and for annotating media files. One embodiment includes a method including generating a challenge to a user, wherein the challenge includes a verify part and a read part. The methods also includes prompting the user to solve both the verify part of the challenge and the read part of the challenge; receiving input from the user; determining if the input from the user relative to the verify part of the challenge corresponds with the known answer for the verify part of the challenge; and identifying the input from the user relative to the read part of the challenge as an answer to the read part of the challenge, if the input from the user relative to the verify part of the challenge corresponds with the known answer for the verify part of the challenge.

25 Claims, 9 Drawing Sheets

(56) References Cited

U.S. PATENT DOCUMENTS

| | | | |
|---|---|---|---|
| 6,295,387 B1 | 9/2001 | Burch | |
| 6,956,966 B2 | 10/2005 | Steinberg | |
| 7,149,801 B2 | 12/2006 | Burrows et al. | |
| 7,624,277 B1 | 11/2009 | Simard et al. | |
| 7,841,940 B2 | 11/2010 | Bronstein | |
| 7,891,005 B1 | 2/2011 | Baluja et al. | |
| 7,908,223 B2 * | 3/2011 | Klein et al. | 705/75 |
| 8,019,127 B2 | 9/2011 | Misra | |
| 8,073,912 B2 | 12/2011 | Kaplan | |
| 8,090,219 B2 | 1/2012 | Gossweiler et al. | |
| 8,196,198 B1 | 6/2012 | Eger | |
| 8,332,937 B1 | 12/2012 | Eger | |
| 8,392,986 B1 | 3/2013 | Gossweiler, III | |
| 2002/0141639 A1 | 10/2002 | Steinberg | |
| 2003/0232320 A1 | 12/2003 | Lee | |
| 2004/0073813 A1 | 4/2004 | Pinkas et al. | |
| 2004/0199597 A1 | 10/2004 | Libbey et al. | |
| 2005/0065802 A1 | 3/2005 | Rui et al. | |
| 2005/0229251 A1 | 10/2005 | Chellapilla et al. | |
| 2006/0015812 A1 | 1/2006 | Cunningham et al. | |
| 2006/0021024 A1 | 1/2006 | Park | |
| 2006/0286530 A1 | 12/2006 | Forrest et al. | |
| 2007/0005500 A1 | 1/2007 | Steeves et al. | |
| 2007/0130618 A1 * | 6/2007 | Chen | 726/8 |
| 2007/0201745 A1 | 8/2007 | Wang et al. | |
| 2007/0234423 A1 | 10/2007 | Goodman et al. | |
| 2008/0216163 A1 | 9/2008 | Pratte et al. | |
| 2008/0244700 A1 | 10/2008 | Osborn et al. | |
| 2009/0046929 A1 | 2/2009 | De Leon | |
| 2009/0077628 A1 * | 3/2009 | Elson et al. | 726/2 |
| 2009/0113294 A1 | 4/2009 | Sanghavi et al. | |
| 2009/0138468 A1 | 5/2009 | Kurihara | |
| 2009/0150983 A1 | 6/2009 | Saxena et al. | |
| 2009/0235178 A1 | 9/2009 | Cipriani et al. | |
| 2009/0249476 A1 | 10/2009 | Seacat | |
| 2009/0249477 A1 | 10/2009 | Punera et al. | |
| 2009/0293119 A1 | 11/2009 | Jonsson | |
| 2009/0319274 A1 | 12/2009 | Gross | |
| 2009/0320124 A1 | 12/2009 | Taxier et al. | |
| 2009/0325696 A1 | 12/2009 | Gross | |
| 2009/0328150 A1 | 12/2009 | Gross | |
| 2010/0077209 A1 | 3/2010 | Broder et al. | |
| 2010/0077210 A1 | 3/2010 | Broder et al. | |
| 2010/0100725 A1 | 4/2010 | Ozie et al. | |

FOREIGN PATENT DOCUMENTS

| | | | |
|---|---|---|---|
| JP | 2006-287843 A | 10/2006 | |
| JP | 2007-525767 A | 9/2007 | |
| WO | 2008091675 | 7/2008 | |

OTHER PUBLICATIONS

Xu, et al, "Mandatory Human participation: a new authentication scheme for building secure systems", College of Computing, Georgia Institute of Technology, 2003 IEEE, pp. 547-552.
Lopresti, "Leveraging the CAPTCHA Problem", HIP 2005, LNCS 3517, 2005, pp. 97-110.
Chew, et al "Collaborative Filtering CAPTCHAs", HIP 2005, LNCS 3517, 2005, pp. 66-81.
PCT Form PCT/ISA/220, Notification of Transmittal of the International Search Report and Written Opinion for PCT/US08/00949, dated Jun. 19, 2008.
PCT Form PCT/ISA/210, International Search Report for PCT/US08/00949, dated Jun. 19, 2008.
PCT Form PCT/ISA/237, Written Opinion for PCT/US08/00949, dated Jun. 19, 2008.
Luis Von Ahn, "Games with a Purpose", IEEE Computer Magazine, Jun. 2006, pp. 96-98.
Luis Von Ahn, et al., "Labeling Images with a Computer Game", ACM Conference on Human Factors in Computing Systems, CHI 2004, pp. 319-326.
Luis Von Ahn, et al., "Peekaboom: A Game for Locating Objects in Images", ACM Conference on Human Factors in Computing Systems, CHI 2006, pp. 55-64.
Jeremy Elson, et al., "Asirra: A CAPTCHA that Exploits Interest-Alighned Manual Image Categorization", ACM Conference on Computer and Communications Security, CCS 2007.
Kumar Chellapilla, "Using Machine Learning to Break Visual Human Interaction Proofs (HIPs)", printed on Jul. 22, 2009 from http://research.microsoft.com/en-us/um/people/kumarc/pubs/chellapilla_nips04.pdf.
Greg Mori, et al., "Recognizing Objects in Adversarial Clutter: Breaking a Visual CAPTCHA", printed on Jul. 22, 2009 from http://www.cs.sfu.ca/~mori/research/papers/mori_cvpr03.pdf.
A. Thayananthan, et al., "Shape Context and Chamfer Matching in Cluttered Scenes", printed on Jul. 22, 2009 from http://mi.eng.cam.ac.uk/reports/svr-ftp/thayananthan_cvpr03.pdf.
PCT/IPEA/401 Demand with arguments accompanying Demand, dated Dec. 3, 2009, concerning International Application No. PCT/US2008/000949.
PCT/IPEA/416 Notification of Transmittal of International Preliminary Report on Patentability, dated Dec. 3, 2009, concerning International Application No. PCT/US2008/000949.
PCT/IPEA/409 International Preliminary Report on Patentability, dated Nov. 18, 2009, concerning International Application No. PCT/US2008/000949.
Office Action for Chinese Patent Application No. 200880002917.8 (with English Translation), mailed on May 12, 2011, 7 pages.
Office Action for CN Application No. 200880002917.8 (with Translation), mailed Jan. 5, 2013, 11 pages.
Office Action for JP Application No. 20090547296 (with Translation), mailed Dec. 18, 2012, 5 pages.
Non-Final Office Action for U.S. Appl. No. 12/254,325, mailed Aug. 28, 2012, 19 pages.
Final Office Action Response and RCE for U.S. Appl. No. 12/254,325, filed May 10, 2012, 17 pages.
Non-Final Office Action Response for U.S. Appl. No. 12/254,325, filed Nov. 15, 2012, 12 pages.
Non-Final Office Action Response for U.S. Appl. No. 12/486,714, filed Jun. 4, 2012, 14 pages.
Notice of Allowance for U.S. Appl. No. 12/486,714, mailed Oct. 3, 2012, 19 pages.
Notice of Allowance for U.S. Appl. No. 12/486,714, mailed Nov. 5, 2012, 13 pages.
RCE for U.S. Appl. No. 12/486,714, filed Oct. 19, 2012, 2 pages.
Final Office Action Response for U.S. Appl. No. 12/606,465, filed Oct. 5, 2012, 14 pages.
Final Office Action for U.S. Appl. No. 12/606,465, mailed May 9, 2012, 22 pages.
Non-Final Office Action for U.S. Appl. No. 13/463,423, mailed Jul. 3, 2012, 24 pages.
Non-Final Office Action Response for U.S. Appl. No. 13/463,423, filed Sep. 25, 2012, 11 pages.
Notice of Allowance for U.S. Appl. No. 13/463,423, mailed Oct. 16, 2012, 16 pages.
Office Action Response for Canadian Application No. 2,676,395, filed on Jun. 7, 2012, 15 pages.
Office Action for Chinese Application No. 200880002917.8 (with English Translation), mailed Apr. 16, 2012, 10 pages.
Office Action Response for Chinese Application No. 200880002917.8, filed Sep. 4, 2012, 14 pages.
Hofmueller, et al, "Request for Comment: The Transmission of IP Datagrams over the Semaphore Flag", Network Working Group, The Internet Engineering Task Force (IETF), Apr. 1, 2007, 14 pages.
Luo, et al, "A Probabilistic Approach to Image Orientation Detection via Confidence-Based Integration of Low-Level and Semantic Cues", 2004, 8 pages.
Non-Final Office Action for U.S. Appl. No. 12/345,265, mailed Oct. 14, 2011, 23 pages.
Communication Pursuant to Art 94(3) for European Application No. 08713263.5, mailed Dec. 23, 2011, 4 pages.
Lopresti, "Leveraging the CAPTCHA Problem", HIP 2005, LNCS 3517, May 20, 2005, pp. 97-110.
Shirali-Shahrea, "Collage CAPTCHA", IEEE 2007, 4 pages.
Shirali-Shahrea, "Online Collage CAPTCHA", WIAMIS '07: Eight International Workshop on Image Analysis for Multimedia Interactive Services, 2007, 4 pages.

Notice of Allowance for U.S. Appl. No. 12/254,312, mailed Nov. 7, 2011, 19 pages.
"Figure", The American Heritage Dictionary of the English Language, 2007, retrieved on Aug. 13, 2011 from http://www.credoreference.com/entry/hmdictenglang/figure, 4 pages.
Restriction Requirement Response for U.S. Appl. No. 12/254,312, filed Oct. 14, 2011, 1 page.
Non-Final Office Action for U.S. Appl. No. 12/606,465, mailed Aug. 19, 2011, 25 pages.
Non-Final Office Action for U.S. Appl. No. 12/254,325, mailed Sep. 1, 2011, 17 pages.
Restriction Requirement for U.S. Appl. No. 12/254,312, mailed Sep. 14, 2011, 5 pages.
"Sampling Information", Minnesota Center for Survey Research—University of Minnesota, 2007, 4 pages.
Final Office Action for U.S. Appl. No. 12/254,325, mailed Feb. 10, 2012, 15 pages.
Non-Final Office Action Response for U.S. Appl. No. 12/254,325, filed Jan. 26, 2012, 22 pages.
Notice of Allowance for U.S. Appl. No. 12/345,265, mailed Feb. 8, 2012, 12 pages.
Non-Final Office Action Response for U.S. Appl. No. 12/345,265, filed Jan. 17, 2012, 17 pages.
Fu, et al., "Upright Orientation of Man-Made Objects", SIGGRAPH 2008, 35th International Conference and Exhibition on Computer Graphics and Interactive Techniques, Aug. 2008, 7 pages.
Chellapilla, et al, "Computers beat Humans at Single Character Recognition in Reading based Human Interaction Proofs (HIPs)", In Proceedings of the Second Conference on Email and Anti-Spam (CEAS), Jul. 2005, 8 pages.
Office Action for CA Application No. 2,676,395, mailed Dec. 9, 2011, 5 pages.
Baluja, et al, "Large Scale Performance Measurement of Content-Based Automated Image-Orientation Detection", IEEE Conference on Image Processing, vol. 2 Sep. 11-14, 2005, 4 pages.
Examiner's First Report for AU Application No. 2008209429, mailed Jan. 23, 2012, 2 pages.
Non-Final Office Action Response for U.S. Appl. No. 12/606,465, filed Jan. 26, 2012, 22 pages.
Luis von Ahn, "Games with a Purpose", Invisible Computing, Jun. 2006, pp. 96-98.
Luis von Ahn, "CAPTCHA: Using Hard AI Problems for Security", Advances in Cryptology—Eurocrypt 2003, pp. 294-311.
Adamchak, et al, "A Guide to Monitoring and Evaluating Adolescent Reproductive Health Programs", Pathfinder International, Focus on Young Adults, 2000, pp. 265-274.

Non-Final Office Action for U.S. Appl. No. 12/486,714, mailed Mar. 2, 2012, 16 pages.
Rui, et al, "Characters or Faces: A User Study on Ease of Use for HIPs", In Proceedings of the 2nd International Workshop on Human Interactive Proofs, vol. 3517, May 2005, 14 pages.
Rowley, et al, "Rotation Invariant Neural Network-Based Face Detection", CMU-CS-97-201, Dec. 1997, 15 pages.
Rowley, et al, "Neural Network-Based Face Detection", IEEE Transactions on Pattern Analysis and Machine Intelligence, vol. 20, No. 1, Jan. 1998, 28 pages.
Mori, "Recognizing Objects in Adversarial Clutter: Breaking a Visual CAPTCHA", Proceedings of Computer Vision and Pattern Recognition, 2003, 8 pages.
Siegle, "Sample Size Calculator", Neag School of Education—University of Connecticut, retrieved on Sep. 18, 2008 from http://www.gifted.uconn.edu/siegle/research/Samples/samplecalculatorhtm, 2 pages.
Vailaya, et al, "Automatic Image Orientation Detection", IEEE Transactions on Image Processing, vol. 11, No. 7, Jul. 2002, 10 pages.
Viola, et al, "Rapid Object Detection Using a Boosted Cascade of Simple Features", Proceedings of Computer Vision and Pattern Recognition, 2001, 13 pages.
von Ahn, et al, "Improving Accessibility of the Web with a Computer Game", Proceedings of the SIGCHI Conference on Human Factors in Computing Systems, Apr. 22-28, 2006, 4 pages.
von Ahn, et al, "Labeling Images with a Computer Game", Proceedings of the SIGCHI Conference on Human Factors in Computing Systems, Apr. 24-29, 2004, 8 pages.
Wu, et al, "Finding Text in Images", Proceedings of the 2nd ACM Int'l Conf. on Digital Libraries, 1997, 14 pages.
von Ahn, et al, "Telling Humans and Computers Apart (Automatically) or How Lazy Cryptographers do AI", Communications on the ACM, vol. 47, No. 2, Feb. 2004, 11 pages.
Wu, et al, "TextFinder: An Automatic System to Detect and Recognize Text in Images", IEEE Transactions on Pattern Analysis and Machine Intelligence, University of Massachusetts, Nov. 18, 1997, 36 pages.
Zheng, et al, "Boosting Image Orientation Detection with Indoor vs. Outdoor Classification", Proceedings of the Sixth IEEE Workshop on Applications of Computer Vision, 5 pages, 2002.
Response to Communication Pursuant to Art 94(3) for European Patent Application No. 08713263.5, filed Apr. 27, 2012, 18 pages.
Office Action Response for CN Application No. 200880002917.8, filed on Sep. 29, 2011, 13 pages.

* cited by examiner

This aged portion of society were distinguished from

Fig. 5

WORLD. between about

Fig. 6

METHODS AND APPARATUSES FOR CONTROLLING ACCESS TO COMPUTER SYSTEMS AND FOR ANNOTATING MEDIA FILES

CROSS-REFERENCE TO RELATED APPLICATIONS

This application is a National Stage of International application number PCT/US2008/000949, filed Jan. 23, 2008, which claims priority from U.S. Provisional Patent Application No. 60/881,962, filed Jan. 23, 2007, both of which are incorporated herein by reference.

STATEMENT REGARDING FEDERALLY-SPONSORED RESEARCH AND DEVELOPMENT

Not Applicable.

FIELD OF THE INVENTION

The present invention is directed generally to methods and apparatuses for controlling access to computer systems and for annotating media files.

BACKGROUND OF THE INVENTION

A CAPTCHA is an acronym for "Completely Automated Public Turing test to tell Computers and Humans Apart" and is a challenge-response test used to determine whether a user is a human or a computer. Such programs are in common use on the World Wide Web and often take the form of images with distorted text in them. CAPTCHAs are used to protect many types of services, including e-mail services, ticket selling services, social networks, wikis, and blogs. They are frequently found at the bottom of Web registration forms and are used, for example, by Hotmail, Yahoo, Gmail, MSN Mail, PayPal, TicketMaster, the United States Patent and Trademark Office, and many other popular Web sites to prevent automated abuse (e.g., programs that are written to obtain many free email accounts every day). CAPTCHAs are effective because computer programs are unable to read distorted text as well as humans can. In general, CAPTCHAs prompt users to prove they are human by typing letters, numbers, and other symbols corresponding to the wavy characters presented in the image.

However, prior art CAPTCHAs have certain drawbacks. In particular, the images used in the prior art CAPTCHAs are artificially created specifically for use as CAPTCHAs, and they are not always well chosen to distinguish between human and non-human users. As a result, spammers and others attempting to circumvent the prior art CAPTCHA systems are becoming increasingly efficient at using computers to correctly answer prior art CAPTCHAs. As a result, there is a need for a more effective way to produce CAPTCHAs that are difficult for computers to answer and are also reasonably easy for humans to answer.

Humans around the world solve over 60 million CAPTCHAs every day, in each case spending roughly ten seconds to type the distorted characters. In aggregate this amounts to over 150,000 human hours. This work is tremendously valuable and, almost by definition, it cannot be done by computers. At present, however, prior art CAPTCHAs do not provide for any useful end for this work aside from using it as a way to restrict access to human users. As a result, there is a need for making more efficient use of the considerable time that is collectively spent solving CAPTCHAs.

Furthermore, physical books or texts that were written before the computer age are currently being digitized en masse (e.g., by The Google Books Project, and The Internet Archive) in order to preserve human knowledge and to make information more accessible to the world. The pages are being photographically scanned into image form, and then transformed into text using optical character recognition ("OCR"). The transformation from images into text by OCR is useful because images are difficult to store on small devices, are expensive to download, and cannot be easily searched. However, one of the biggest stumbling blocks in this digitization process is that OCR is far from perfect at deciphering the words in images of scanned texts. For older prints, where the ink has faded, the pages have turned yellow, or other imperfections exist on the paper, OCR cannot recognize approximately 20% of the words. In contrast to computers, humans are significantly more accurate at transcribing such print. A single human can achieve over 95% accuracy at the word level. Two humans using the "key and verify" technique, where each types the text independently and then any discrepancies are compared, can achieve over 99.5% accuracy at the word level (errors are not fully independent across multiple humans). Unfortunately, human transcribers are expensive, so only documents of extreme importance are manually transcribed.

Accordingly, there is a need for improved methods and apparatuses related to CAPTCHAs and, particularly, for methods and apparatuses related to CAPTCHAs that offer advantages beyond controlling access to computer systems, such as for cost-effectively transforming written text into electronic form that can be stored and searched efficiently. Those and other advantages of the present invention will be described in more detail hereinbelow.

BRIEF SUMMARY OF THE INVENTION

The present invention includes methods and apparatuses for controlling access to computer systems and for annotating media files. In particular, the present invention not only offers improved CAPTCHAs, the present invention allows for the operation of CAPTCHA solving to be harnessed and used for additional productive work.

A CAPTCHA includes a challenge-response test that is used to distinguish between human and non-human users. According to the present invention, the challenge may be, for example, a distorted or an undistorted image of a word that the user must correctly read and type, the challenge may be a distorted or an undistorted audio clip which the user must hear and type, the challenge may be a distorted or an undistorted image of an object which the user must identify and type the name, or the challenge may take some other form. Furthermore, according to some embodiments of the present invention, the challenge may include one or more parts, as will be described in more detail hereinbelow. The present invention will sometimes be referred to as a "re-CAPTCHA".

The present invention can be included or embodied as computer software which, when executed by a processor, causes the processor to perform certain actions according to the present invention. In one embodiment, the present invention includes a single computer or two or more computers connected through a network. One or more of the computers has memory including computer-readable instructions which, when executed, cause the processor to perform the tasks described herein.

Solving CAPTCHAs, by definition, requires people to perform a task that computers cannot yet perform. The present invention makes positive use of this human effort, and useful results that one may expect to be achieved in this way include, but are not limited to, recognizing text that optical character recognition ("OCR") programs cannot interpret, transcribing audio files which voice recognition programs have not been able to interpret, and other uses. In other words, the present invention makes it is possible to use CAPTCHAs to help digitize media that would otherwise not be cost-effective to digitize. In the case of written texts, this means using CAPTCHAs to have humans decipher the words that computers cannot recognize.

In particular, the present invention can be used to transcribe old print material, word by word, into electronic form that can be stored and searched efficiently. The present invention can also be used in connection with handwritten documents, using either handwritten printed characters or handwritten cursive characters. With regard to handwritten text, the present invention can be used, for example, to transcribe letters and other documents that would otherwise be expensive to transcribe. Handwritten texts are particularly difficult for OCR, and the present invention can harness the power of people solving CAPTCHAs throughout the World Wide Web or in other venues to assist in this process. Whereas "standard" CAPTCHAs display images of random characters rendered by a computer, the present invention can display words or distorted images of words that come from scanned texts. The solutions entered by the users are then aggregated to improve character recognition in the digitization process.

In some embodiments, to increase efficiency, only the words that automated OCR programs cannot recognize are sent to humans and used as challenges in CAPTCHAs. However, in other embodiments, the present invention is not limited only to words that automated OCR programs cannot recognize. For example, words that are properly identified by OCR programs may be used as the "verify" or "known" words in the present invention, as described in more detail hereinbelow.

To assist in differentiating between humans and computers, the system needs to be able to verify the user's work. Some embodiments of the present invention use a two part challenge, in which a user is given two words, one for which the answer is not known (also referred to as the "read" part), and another for which the answer is known (also referred to as the "verify" part). If the user correctly types the "known" word, the system gains confidence that the user also typed the "unknown" word correctly. This aspect of the present invention is not limited to word challenges, and two part challenges using audio clips and other forms of challenges may also be used with the present invention.

In part, the present invention will be used to channel the human effort that is spent solving millions of CAPTCHAs every day into "reading" books online. Multiple projects are currently attempting to digitize physical books (e.g., Google Books, the Internet Archive, etc.). The books are scanned, and then, in order to make them searchable, transformed into ASCII text using OCR. Although OCR can achieve extremely high accuracy on most books, there are many that are poorly scanned, damaged (e.g., with pencil or pen markings), or that have simply deteriorated with age to the point that the text has been significantly distorted. In such cases, OCR achieves a low percentage of recognition (see FIG. 5, for example). The present invention will improve the process of digitizing books by sending words that cannot be read by OCR programs to humans on the Web in the form of CAPTCHAs.

According to some embodiments of the present invention, an image of a scanned page of a book is processed by multiple OCR programs. Those words that cannot be read correctly by OCR are segregated into images containing a single word, more than one word, or part of a word. For example, long words may be separated into two or more parts, and short words may be combined together. Automatically separating the words can be done with significantly more accuracy by OCR programs than recognizing what the words are. Furthermore, most common OCR programs return a confidence score for each word, and this confidence score can be used to determine whether or not the word was read correctly. Each such word-image will be used as a CAPTCHA (see FIG. 6) and is sometimes designated hereafter as a "re-CAPTCHA."

In the case of audio files of spoken words, a similar process is followed. The audio files are processed through speech recognition software and portions which cannot be recognized (or for which the recognition has a low confidence score) are presented to the user for transcription. Since speech is a continuous process, as opposed to reading in which words are discrete and separated by white space, it is likely that the sound clips presented to the user will contain several words or whole sentences. Regardless of the number of words used, the audio files which the speech recognition software cannot process with high confidence may also used as An unknown part of a challenge in the reCAPTCHA process.

There is a significant issue as to when one can be certain that correct answer has been given for such a CAPTCHA. This issue is resolved with the present invention by using the people themselves. Whenever the present invention encounters a new word that cannot be read correctly by OCR, it will be presented to a user in conjunction with an image of another word for which one already knows the answer. The user will then be asked to solve both the "known" (or "verify") word and the "unknown" (or "read") word. If the user solves the known word for which the answer was already known, one may assume the answer is also correct for the previously unknown word. The present invention may present the unknown word to a number of users to determine, with higher confidence, if the original answer was correct. Once a certain number of people have all submitted the same answer for the same unknown word, one may assume that this answer is correct.

It is important that the present invention is secure and effective against attempts by non-human users. One way to ensure the robustness of the present invention is to ensure that the same image, audio clip, or other challenge is never presented twice in the same form. This is because it is possible to write a malicious software program that can collect previously recognized challenges and store the image (or audio file) along with the previously determined correct interpretation. Once this is done the malicious program can access a web site that presents a CAPTCHA challenge, search its files to see whether the image (or audio file) has been correctly identified previously, and then supply the previously stored correct response for the challenge. Having done this, the same malicious program could then provide a totally fictitious interpretation of the unknown part of the challenge (e.g., the read word) and then store both the unknown image (or audio file) and the fictitious answer so that the same fictitious answer can be given if the malicious software subsequently encounters the same challenge. By doing so repeatedly, the malicious software could eventually provide the same fictitious answer for the unknown part of the challenge so that the computer presenting the re-CAPTCHA would improperly assign a high confidence level to this answer for the unknown part of the challenge.

Furthermore, to secure against "bots" or automated agents, the present invention may employ multiple mechanisms. For example, images of unknown words will be given to multiple users in order to gain confidence about the correctness of the word. In addition, when an image or other challenge is given to multiple users it may be randomly distorted each time prior to being presented to the user. Therefore identical images will never be served multiple times.

An added benefit of the present invention is that if it is ever broken by an automated bot, then that bot can be used to directly improve the character recognition accuracy in scanned books or in transcribing audio files. That is, improvements in the accuracy of programs in defeating the present invention directly translate to improvements in automated recognition of text in scanned books or audio in recorded clips. This is not true of previous CAPTCHAs, where the images were artificially created.

In summary, the present invention can be used to distinguish between humans and computers and to generate useful information. Symbols, such as images (or sound clips) which computers cannot interpret, are presented to the entity attempting to access a web site. Some of these symbols have been previously identified and others, have not been previously identified. If the entity accessing a web site correctly interprets the previously identified symbol(s) the entity is assumed to be a human and the information that it has entered is assumed to be correct; if the entity does not correctly enter a correct interpretation then the entity is assumed to be a computer. After presenting an unknown word challenge to a number of users determined to be humans, the interpretations of the unknown words are compared and a confidence level established for each interpretation. Once the confidence level of an interpretation reaches a predetermined level the interpretation is assumed to be correct. In this way one can harvest the brainpower of computer users to gather information which computers are not capable of generating, such as identification of words which cannot be correctly identified by optical character recognition programs or transcription of speech which speech recognition programs cannot recognize. To prevent malicious software from repeatedly providing a consistent but incorrect answer to an unknown word in a challenge, both the previously identified symbol and the unknown word are randomly distorted prior to being presented to the user, preventing the malicious software from repeatedly recognizing the unknown word.

Many variations are possible with the present invention. These and other teachings, variations, and advantages of the present invention will become apparent from the following detailed description of the invention.

BRIEF DESCRIPTION OF THE SEVERAL VIEWS OF THE DRAWING

Embodiments of the present invention will now be described, by way of example only, with reference to the accompanying drawings for the purpose of illustrating the embodiments, and not for purposes of limiting the invention, wherein:

FIG. 5 illustrates one example of text scanned from a book.

FIG. 6 illustrates examples images generated from scanned books according to the present invention.

DETAILED DESCRIPTION OF THE INVENTION

Figure 1:
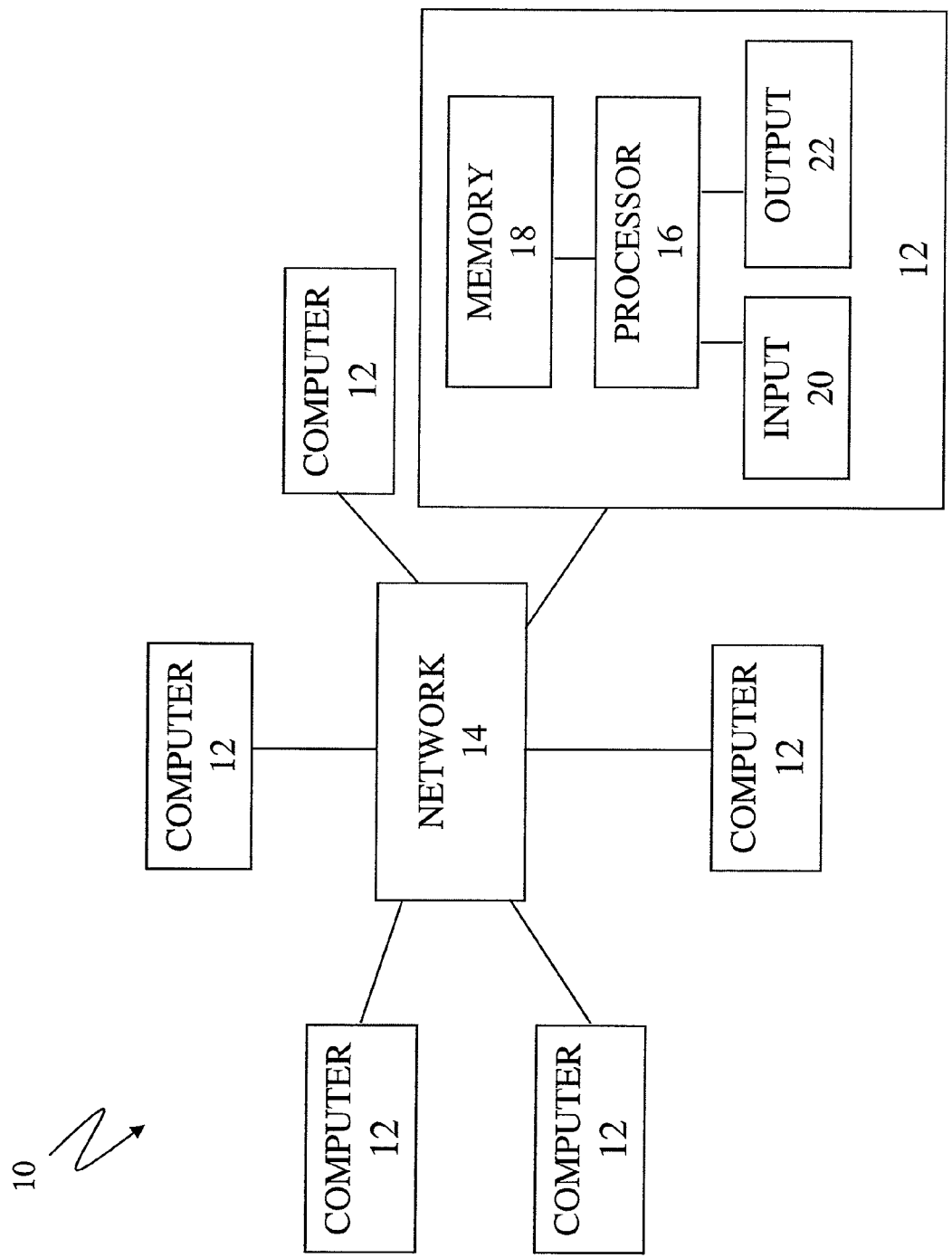
FIG. 1 illustrates one embodiment of a system according to the present invention.

FIG. 1 illustrates one embodiment of a system 10 according to the present invention. The system 10 includes several computers 12 connected together through a network 14. Although only one computer 12 is shown with a processor 16, memory 18, an input device 20, and an output device 22, other computers 12 may also include processors 16, memory 18, an input device 20, and an output device 22. Furthermore, the system 10 may include more or fewer computers 12 than are illustrated in FIG. 1.

The system 10 does not need to be dedicated to the operation of the present invention, and while some of the computers 12 in the system 10 may be used by people utilizing the present invention (e.g., people seeking access to other parts of the system 10), other computers 12 may be associated with processes controlling the operation of the present invention and the operation of the system 10 (e.g., servers controlling the interaction between users, collecting and processing data, and creating or updating databases according to the present invention), and some of the computers 12 may be used by people performing other tasks not associated with the present invention (e.g., people communicating over the network 14 independent of the present invention).

The computers 12 may be computers in the traditional sense, such as general purpose computers, servers, or other types of computers. Also, one or more of the computers 12 may be no more than input/output devices, such as dumb terminals, allowing the user to communicate with other parts of the system 10. The computers 12 may all be the same or they may be different. The computers 12 may include, for example, processors 16, memory devices 18, input devices 20, output devices 22.

The computers 12 may take different forms. While computers 12 are generally described in terms of interfaces for a human user, in some embodiment a computer may includes a processor 16 and memory device 18 connected to the network 14 without any human interface device (such as without a keyboard 20 or a display 22). Such a computer 12 may be accessed, for example, through the network 14 from one or more of the other computers 12 and may be used, for example, to process and store data according to the present invention or to operate and control the processes according to the present invention. More than one processor 16 and memory device 18 may be used according to the present invention. In one embodiment, a processor 16 and memory devices 18 is used to perform tasks according to the present invention, and a different processor 16 and different memory device 18 is used to create, store, process, and access a database created according to the present invention. Additional processors 16 and memory devices 18 may also be used.

The network 14 may be, for example, the Internet or some other public or private network. In other embodiments the network 14 may be direct connections between the computers 12, such as cables or wires without using traditional network elements. Furthermore, the number, type, interconnection, and other characteristics of the system 10, computers 12, and network 14 can vary according to the present invention.

The processor 16 receives input from the input device 20 and/or from other computers 12 and provides signals to control the output device 22 or to provide data to or to control other computers 12 or other parts of the system 10. The processor 16 also performs certain functions, as described herein. The processors 16 may execute computer-readable instructions, such as in the form of software, firmware, and hardware. The computer-readable instructions, when executed by the processor 16, may cause the processors 16 or other devices to operate in a particular manner and to cause signals to be processed in a particular manner. The computer-readable instructions may be stored, for example, in one or more memory devices 18, which may or may not be shared by two or more processors 16 or other devices. The processors 16 may also be included in other parts of the system 10 to control various aspects of the system's 10 operation. The processors 16 may work together or independently.

The memory 18 can be any form of computer-readable memory embodied as any form of computer-readable media. For example, memory 18 may store information in magnetic form, electronic form, optical form, or other forms, and may be integral with another device, such as a processor 16, or it may be separate, such as a stand-alone or a removable memory device 18. The memory 18 may be embodied as various forms of media 18, such as optical disks, magnetic disks, portable/removable memory devices, and other forms.

The memory 18 may include computer-readable instructions which, when executed by the processor 16, cause the processor 16 to perform certain functions, as described herein. The memory 18 may be separate from the processor 16, or the memory 18 may be integrated with the processor 16. The memory 18 may also include more than one memory device, which may be integrated with the processor 16, separate from the processor 16, or both. In this way, the system 10 may be caused to operate in a desired manner according to the present invention.

The input device 20 may be a keyboard, a touchscreen, a computer mouse, a microphone, or other forms of inputting information from a user.

The output device 22 may be a video display, a speaker, or other forms of outputting information to a user.

Many variations are possible with the system 10 according to the present invention. For example, although the system 10 is illustrated in the context of operating over a network 14, the system 10 may be implemented as a stand-alone machine with one or more computers 12 and not relying on a network 14. Also, more than one processor 16, memory 18, input device 20, and output device 22 may be present with each computer 12. In addition, devices not shown in FIG. 1 may also be included in the system 10, and some devices shown in FIG. 1 may be omitted, combined or integrated together into a single device.

The present invention is described in terms of controlling accessing a "system". The "system" to which access is controlled will generally be described in terms of one or more computers 12 which may be embodied, for example, as a web server and/or other devices working together as a computer system 12. The present invention also uses the term "system" with reference number 10 in the context of a group of several computers 12 connected via a network 14. Access to a system 10 may also be controlled by the present invention and is included in computer system 12 to which access is controlled by the present invention.

Figure 2:
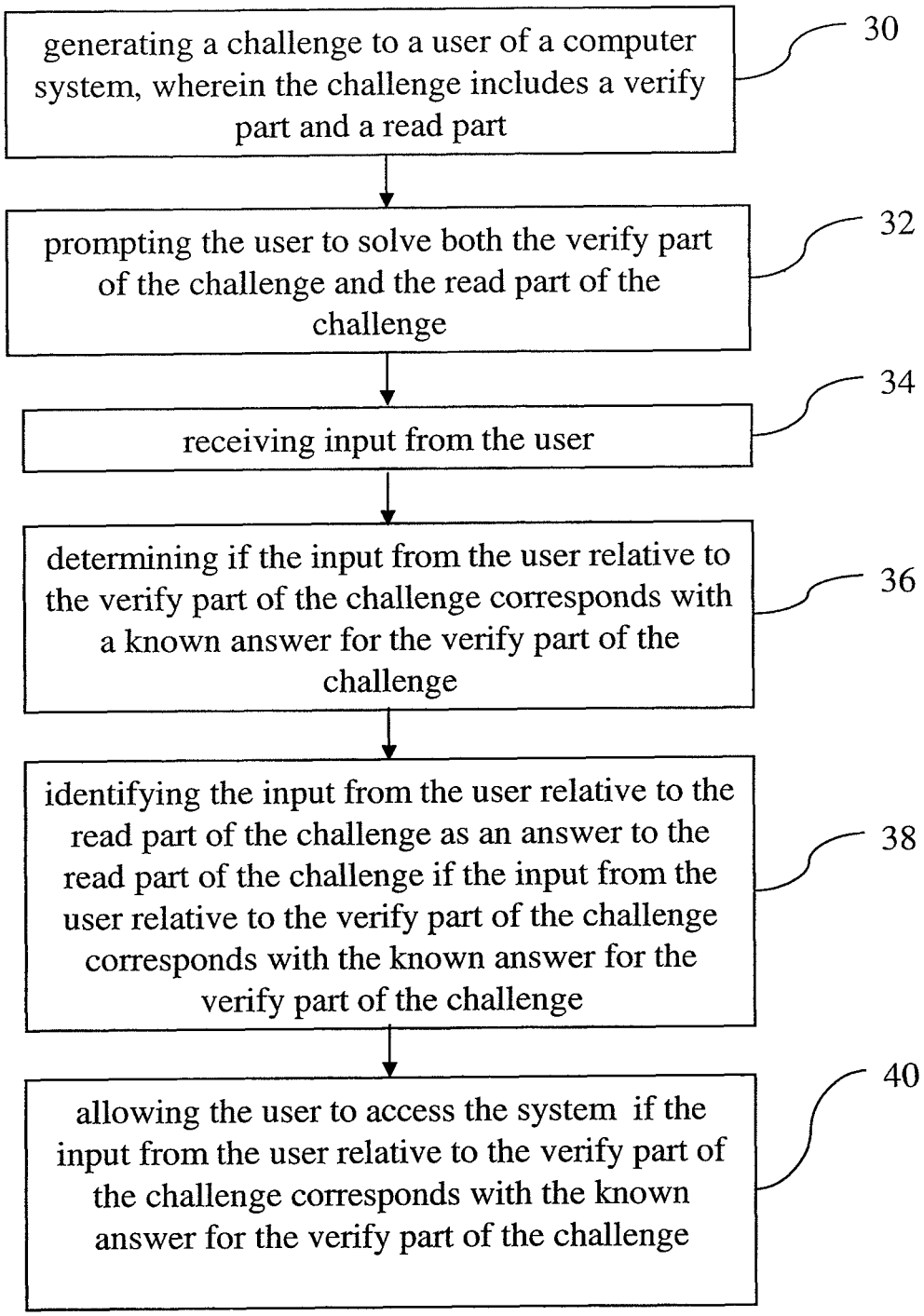
FIG. 2 is a flow chart illustrating one embodiment of a method according to the present invention.

FIG. 2 is a flow chart illustrating one embodiment of a method according to the present invention. The method may be embodied, for example, in computer-readable instructions stored in one or more memory devices 18 in the system 10 and executed by one or more processors 16 in the system 10.

Step 30 of the method includes generating a challenge to a user of a computer system. The challenge includes a "verify" part for which an answer is known, and a "read" part of the challenge for which an answer is not known. The challenge may be, for example, a visual challenge in which the user is prompted to look at an image and produce a particular response. Although the present invention will generally be described in terms of visual challenges, the present invention is not limited to use with challenges that are visual. For example, in other variations of the present invention the challenge may be an audio challenge in which the user is prompted to listen to an audio recording and produce a desired response. It is also possible for the present invention to be used with challenges other than visual and audio, such as tactile challenges that may be used, for example, in a manner similar to Braille, and challenges related to smell and taste.

As used herein, "known" and "not known" may refer to a certainty regarding the answer for a corresponding part of the challenge. In contrast, "known" and "not known" may not represent a certainty and may instead refer to a level of confidence regarding the answer. For example, optical character recognition ("OCR") processes generally produces a confidence score regarding the accuracy of a conversion of an image to an electronic representation of the characters in that image. This may be done, for example, on a character by character basis, on a word by word basis, or in other ways. This confidence score from OCR process may be used in determining whether a character, series of characters, words, or a series of words is "known" or "not known". Other criteria may also be used to make the determination of "known" and "not known".

Step 32 includes prompting the user to solve both the verify part of the challenge and the read part of the challenge. The user may be prompted with a visual challenge by presenting both the read and the verify parts of the challenge on a monitor or other output device. The read and verify parts may be presented at the same time or at different times. In general, it is believed that the best results will be achieved if the read and the verify part are indistinguishable from each other in general appearance (such as in the same or similar font, size, and amount of distortion), although this is not required for the present invention. As a result, the present invention may include modifying at least one perceptible characteristic of one or both of the verify part of the challenge and the read part of the challenge. The modifying step may be part of the step of generating a challenge 30, or it may be a separate step performed, for example, after generating the challenge 30 and before prompting the user 32.

For example, in a visual challenge the read and verify parts may be distorted in the same manner so that they have similar appearances. If the read and verify parts are not similar in appearance to begin with, one may be distorted in a manner different than the other so as to make their appearances similar. It is not required, however, that the read and verify parts have the same general appearance, and in some embodiments of the present invention the read and verify parts have different appearances, such as from distorting the read and verify parts differently.

According to one embodiment of the present invention, the read and verify parts of the challenge are taken from the same source material, such as the same document. In that manner, characteristics of format, font, age, and other distortions to the document will generally be the same between the two parts. Similarly, the order in which the read and verify parts are presented to the user may be varied randomly. For example, the read and verify parts may be presented side by side, with the read part appearing first some of the time, and the verify part appearing first at other times.

Many variations are possible with the manner in which the read and verify parts are presented to the user. For example, the read and verify parts may be run together as a single string of characters or they may be separated as two or more different words or two or more different strings of characters. For example, a single long word may be broken into two or more parts, or two or more short words may be grouped together. In addition, it is possible to use more than one read parts (e.g., a read part having more than one word), and more than one verify parts (e.g., a verify part having more than one word). For example, some embodiments may use one read part and two or more verify parts, some embodiments may use two or more read parts and one verify part, and some embodiments may use two or more read parts and two or more verify parts.

The present invention will generally be described in terms of a visual challenge consisting of distorted images of words, although the present invention is not limited to such challenges. For example, the challenge may be in the form of one or more numbers, other characters, symbols, or combinations of numbers, letters, characters, or symbols. For example, the present invention may take several characters from one or more known or unknown words and use them as part of a challenge. Other variations are also possible, for example, such as a challenge including a picture or drawing which the user solves by typing the name of an object in the picture or drawing. Many other variations are also possible with the present invention.

Step 34 includes receiving input from the user. This input is the user's answer to the challenge and may be presented, for example, as an electronic representation of characters, as an electronic representation of audio data, or in other forms depending on the nature of the challenge. For example, if the user types an answer from a keyboard, the answer from the user is likely to be in the form of an ASCII representation in electronic form.

Step 36 includes determining if the input from the user relative to the verify part of the challenge corresponds with the known answer for the verify part of the challenge. Determining if the input from the user relative to the verify part of the challenge corresponds with the known answer for the verify part of the challenge may be done in several ways. For example, the determination may be made by comparing the input from the user with a known answer. In another embodiment, the input from the user may be sent to another location, such as a different computer 12 in the network 14, where the input from the user may be compared to a known answer and, thereafter, the results are returned. In this way, for example, the answers to the challenges may be kept, for example, in one or more central repository. Web site servers or other computers using the present invention can receive the challenges from the central repository, and then send back to the central repository (or to some other computer 12) data indicative of the proposed answers from users. The central repository (or other computer 12) will provide information indicative of whether the challenge has been correctly answered and, thereby, whether the user is deemed to be a human or a non-human. Other variations are also possible.

Step 38 includes identifying the input from the user relative to the read part of the challenge as an answer to the read part of the challenge if the input from the user relative to the verify part of the challenge corresponds with the known answer for the verify part of the challenge. In other words, if the user provides a correct answer for the verify part, then it is assumed that the user is human and can properly identify the read part of the challenge. Therefore, the user's answer to the read part of the challenge is identified as an answer, or a potential answer, for the read part of the challenge. As described hereinbelow, a read part may be used more than one time and the answers compared before it is determined whether a particular answer is correct.

As a result, the user may be deemed to be a human without determining the accuracy of the answer given for the unknown (or read part) of the challenge. In other words, less than all of the user's answer is checked or verified before a decision is made whether to grant access to the user. However, as stated herein, efforts are made to make it difficult for the user to know what part of the challenge is the read part and what part of the challenge is the verify part. Therefore, a human user will have an easier and more enjoyable experience (and gain access more quickly) by solving the entire challenge rather than attempting to guess the minimum possible correct answer required to gain access.

Step 40 includes allowing the user to access the system if the input from the user relative to the verify part of the challenge corresponds with the known answer for the verify part of the challenge. In other words, when the user is determined to be a human user, the user is granted access.

Many variations are possible with the present invention. For example, although the present invention has generally been described in terms of allowing the user access if the input from the user relative to the verify part of the challenge corresponds with known answer for the verify part of the challenge, the present invention is not so limited. For example, additional tests may be presented to the user before access is granted.

Another embodiment of the present invention modifies the present invention to accommodate the user. For example, the user may provide his or her nationality or preferred language, and the present invention can thereby provide challenge material in an appropriate language. Similarly, from the user's IP address the country in which the user is operating can be determined and that may be used to provide language appropriate challenges.

The present invention can also improve the likelihood that challenges are easily solved by humans by measuring, for each instance, how successful humans are at solving it, and how long it takes them to do so. Challenges that are easier for humans will be reused more often, thus increasing the overall success rate for humans.

Similarly, the present invention may allow for certain "human" behavior in assessing the input from the user. In some embodiments the present invention allows for a predetermined number or type of typographical errors (e.g., one per word) in the answer provided by the user.

In other embodiments, known human behavior may be identified as being unwelcome. For example, it is possible to know certain information about the users, such as their IP address, the country in which they are operating, and their previous history with CAPTCHA (such as through the use of cookies). As a result, certain behavior may be used to identify undesirable human users, such as those attempting to generate user accounts which are sold or otherwise provided to spammers. For example, if a user answers more than a predetermined number of CAPTCHA challenges in a given period of time, the user may be marked as a non-genuine user. Certain steps may be taken against such users, such as providing them with longer words in their challenges, providing them with challenges that are more distorted than normal, and refusing further access to such users in extreme cases.

Figure 3:
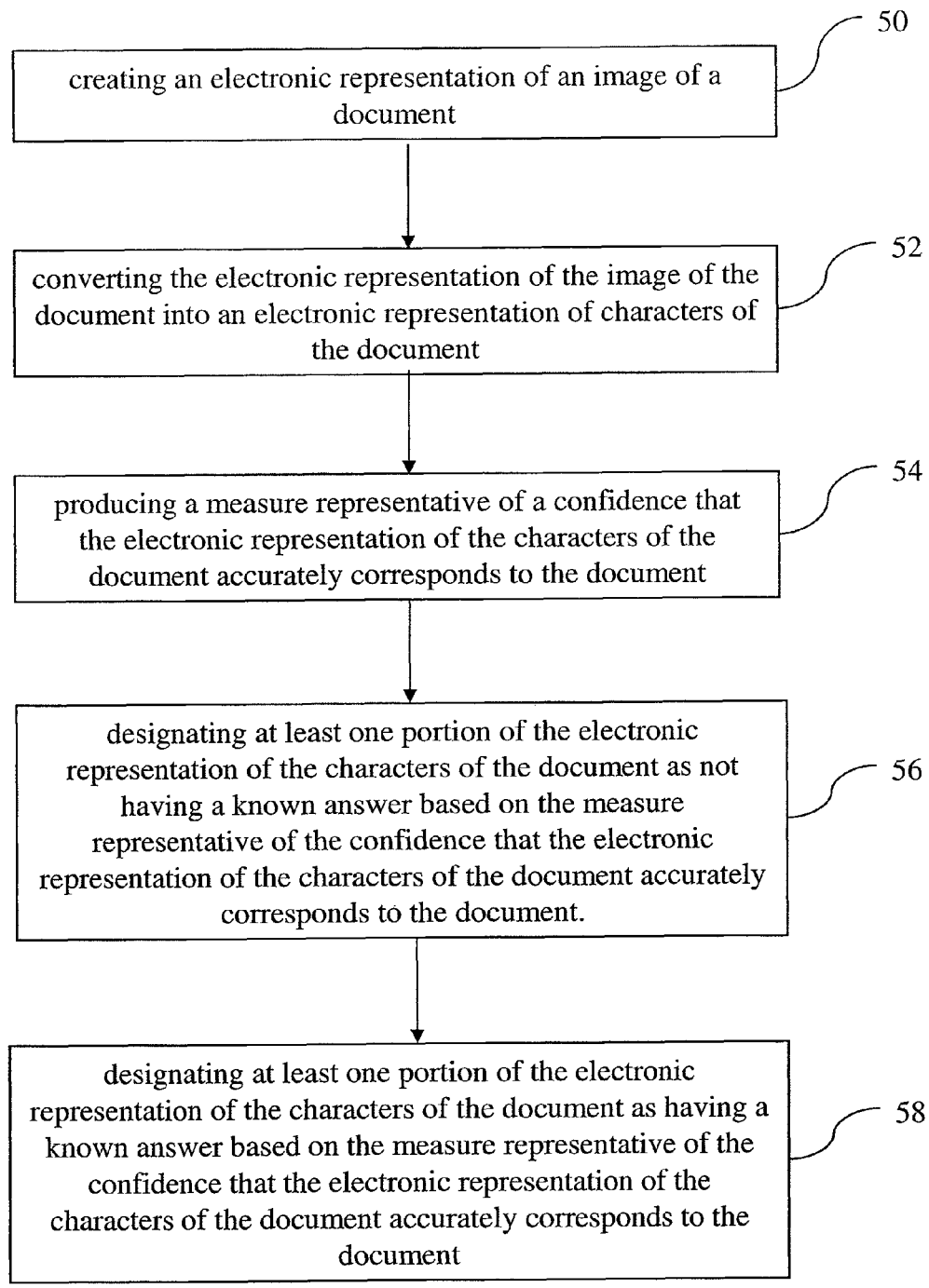
FIG. 3 is a flow chart illustrating one embodiment of a method according to the present invention in which the read parts and the verify parts are generated.

FIG. 3 is a flow chart illustrating one embodiment of the present invention in which the read parts and the verify parts are generated. This part of the present invention may be used to generate the read and verify parts of the challenge. However, this is not required and, for example, it is possible to create read and verify parts of the challenge through other sources, and not as provided herein. The read and verify parts of the challenge may both be generated from the same document, or they may be generated from different documents or from sources other than documents. The method illustrated in this figure may be embodied, for example, in computer-readable instructions stored in one or more memory devices 18 in the system 10 and executed by one or more processors 16 in the system 10

Step 50 includes creating an electronic representation of an image of a document. This may be done, for example, by scanning the document using conventional scanning techniques. The document may be, for example, a newspaper, a journal, or any other document on which words are present. Also, it is possible for the present invention to be used with text in various forms. For example, handwritten text (both printed and cursive), such as letters and notes from historically significant people, may be used as source material with the present invention. Furthermore, it is also possible to use documents containing images that do not represent words, such as documents representing numbers, other symbols, or pictures.

Step 52 includes converting the electronic representation of the image of the document into an electronic representation of characters of the document. The may be done, for example, with conventional OCR techniques. In some embodiments, the step of converting is performed more than one time using different OCR techniques. The conversion 52 may also be done, at least in part, by humans. The electronic representation of the images and of the text of the original document may be stored in one or more memory devices 18 accessed by one or more of the computers 12 in the system 10. In other embodiments, the electronic representation of the images and of the text may be stored in memory 18 not connected to the system 10, and may be transferred in any number of ways, such as via a removable or portable memory device 18.

Step 54 includes producing a measure representative of a confidence that the electronic representation of the characters of the document accurately corresponds to the document. The "measure" means any method, or combination of methods, for evaluating a measure of confidence that the electronic representation of the characters of the document accurately corresponds to the document. This measure is used to separate portions of text into "known" parts and "unknown" parts for use with the present invention. This measure may be generated automatically by the OCR process, through human review, or through other means. For example, when more than one OCR technique is used in step 52, the different OCR techniques will sometimes produce a different character or combination of characters for the same portion of the image. In one embodiment of the invention, when one or more different characters are produced, that portion of the text is identified as being "not known". In other embodiments, a character, string of characters, or word is identified as being "not known" if it does not appear in a predetermined database such as, for example, a dictionary. Combinations of factors may be used, and they may be combined and weighted to produce the "measure" representative of a confidence that the electronic representation of the characters of the document accurately corresponds to the document.

Step 56 includes designating at least one portion of the electronic representation of the characters of the document as not having a known answer based on the measure representative of the confidence that the electronic representation of the characters of the document accurately corresponds to the document.

Although it is possible for a document to produce only "known" or only "not known" items, that is unlikely and most documents or other sources for the challenge material will produce both known and not known items. Accordingly, the following step may be included with the present invention, although it is not required to be used with the above steps.

Step 58 includes designating at least one portion of the electronic representation of the characters of the document as having a known answer based on the measurement representative of the confidence that the electronic representation of the characters of the document accurately corresponds to the document.

In some embodiments of the present invention, a "not known" part may become a "known" part. For example, if users consistently give the same answer for a "not known" part, it may be changed to a "known" part and used accordingly. Similarly, if a "known" part is consistently answered incorrectly, it may be changed to a "not known" part. This later example may happen when a portion of the document is incorrectly identified with a high degree of confidence, or when two or more OCR techniques make the same mistake.

Different criteria may be used to change "known" parts to "not known" parts and vice versa. For example, a predetermined number of correct or incorrect answers, respectively, a predetermined percentage of correct or incorrect answers, respectively, or other criteria may be used.

Another method for changing a "known" part to a "not known" part is if too many users "refresh" the challenge. In other words, CAPTCHAs often allow users to "refresh" or get another challenge without attempting the first challenge presented. This is to allow for a situation where the challenge has been distorted beyond the point where even a human can read it. If such a refresh happens too many times, the challenge (or the parts of the challenge) may be removed from the system for human review. In some cases, non-readable text (such as a dirt spot on the document) can be mistakenly read by OCR techniques, or too much distortion may have been applied to the image so that not even a human can read it. Such a situation makes the challenge unhelpful to distinguishing human users from non-human users and steps may be taken to identify and remove them.

Figure 4:
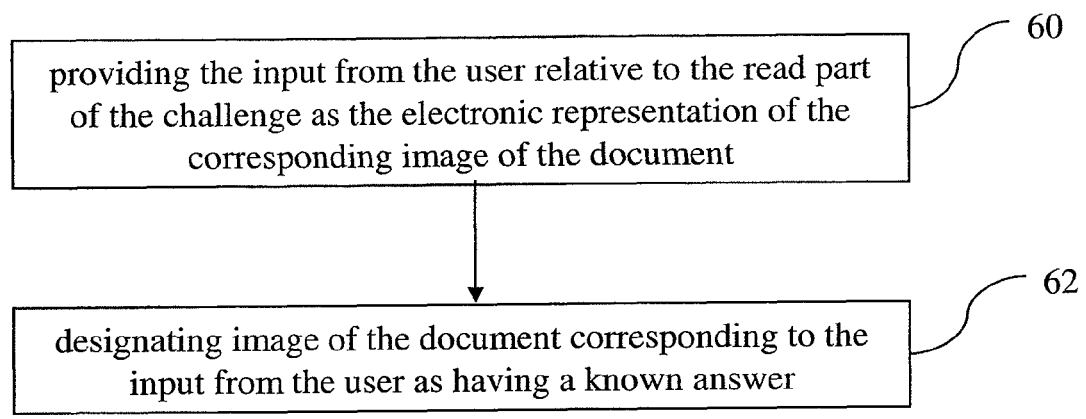
FIG. 4 is a flow chart illustrating one embodiment of the present invention in which the answers to the challenges are used to supplement the electronic representation of documents.

FIG. 4 is a flow chart illustrating one embodiment of the present invention in which the answers to the challenges are used to supplement the electronic representation of documents. In other words, when an answer has been determined for a previously unknown word (an image previously used as the "read" part of the challenge), then this answer can be used to improve the electronic representation of the document from which the image was scanned. This does not, however, mean that the image is no longer used. On the contrary, it is still possible to continue to use the image as a verify part of a challenge, or to use it in other ways. Furthermore, this aspect of the invention is not required, and in some embodiments it is possible that the answers to the unknown words are never used to supplement the original document. For example, it is possible for old texts may be used only as a source for challenge material, without converting the document into an electronic form representative of the text.

The method illustrated in this figure may be embodied, for example, in computer-readable instructions stored in one or more memory devices 18 in the system 10 and executed by one or more processors 16 in the system 10. This portion of the method may, for example, be performed after it is determined that the input from the user relative to the read part of the challenge is an answer to the read part of the challenge.

Step 60 includes providing the input from the user relative to the read part of the challenge as the electronic representation of the corresponding image of the document. In other words, the unknown output from the OCR process can be replaced with a "known" answer. In this way, the actual text electronic translation of the text of the document is improved by replacing unknown or questionable material with "known" material.

Step 62 includes designating image of the document corresponding to the input from the user as having a known answer. In other words, now that the data is "known", that portion of the electronic form of the text can be changes from being designated as "unknown" to being designated as being "known". Of course, it is always possible that "known" material may later be found to be incorrect. In such cases, the materials may be updated and corrected.

The electronic form of the text of the original document may be stored in one or more memory devices 18 accessed by one or more of the computers 12 in the system 10. In other embodiments, the electronic form of the text of the original document may be stored in memory 18 not connected to the system 10, and the newly-determined "known" data may be transferred in any number of ways, such as via a removable or portable memory device 18.

FIG. 5 illustrates one example of text scanned from a book. The ASCII characters associated to it by the OCR engine are: "*niis aged pntkm at society were distinguished from." The present invention may use some or all of this scanned text as part of a challenge in order to control access to a system 10. After using the scanned text as a challenge, the present invention may also be used to identify the text corresponding to the image.

FIG. 6 illustrates examples CAPTCHA images generated from scanned books according to the present invention. There are many ways to create CAPTCHA images, and those illustrated here are illustrative and not limiting.

Figure 7:
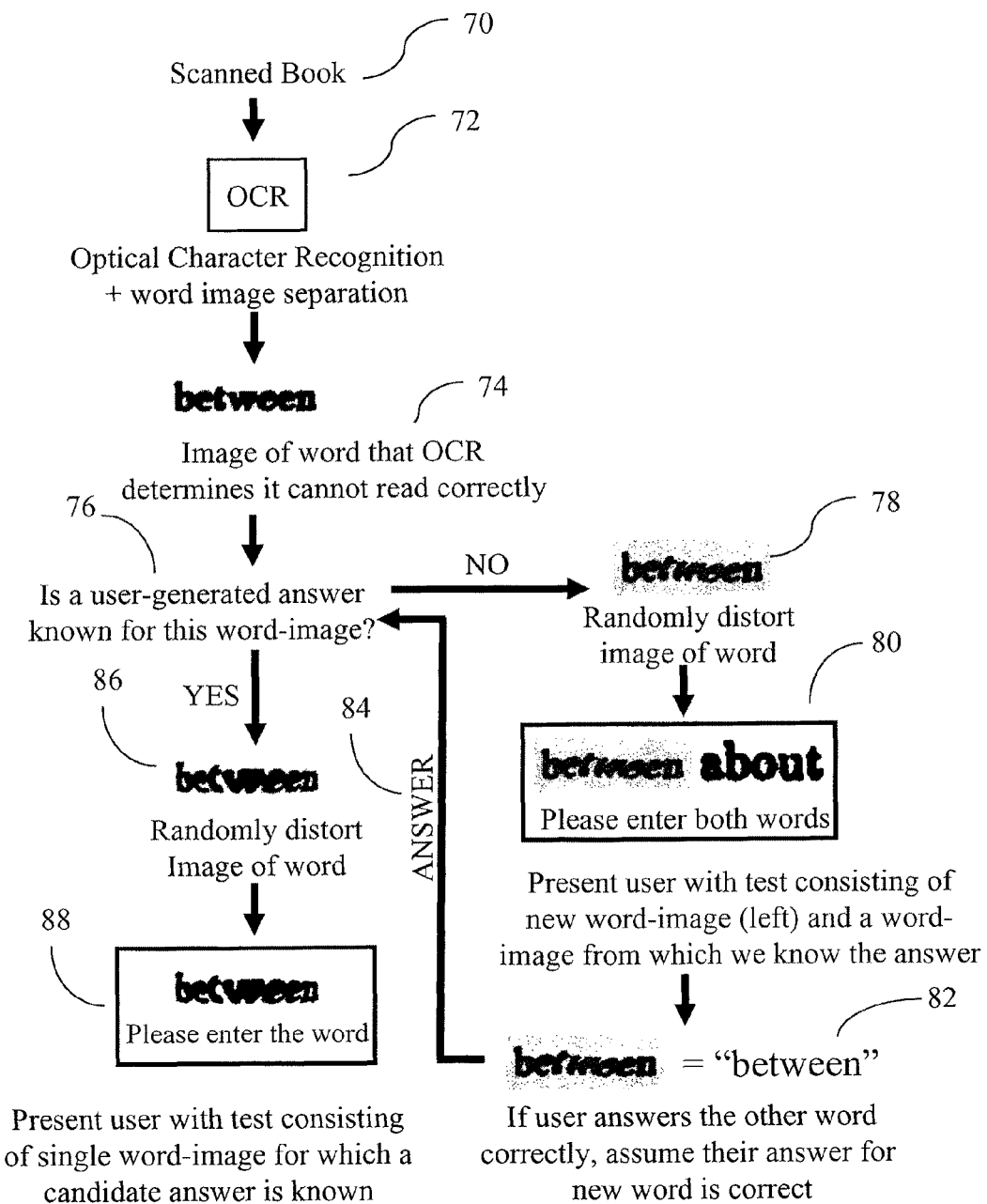
FIG. 7 is flow chart illustrates one embodiment of the operation of the present invention used in conjunction with scanned text from an optical character recognition ("OCR") program.

FIG. 7 is flow chart illustrates one embodiment of the operation of the present invention used in conjunction with scanned text from an optical character recognition ("OCR") program. Although this illustrated embodiment is with regard to a visual challenge using text, this same general process may be used with a visual challenge using non-text, or with non-visual challenges.

Step 70 illustrates a book or other document that is used as a source for the challenge material. The document may be one for which a digital text translation is desired, or it may be a document of little interest but which is a useful source of material for the present invention. The text may be, for example, mechanically printed or hand-written.

Step 72 illustrates optical character recognition ("OCR") or other processes being used to convert images of the document 70 into electronic form. The OCR process 72 may also provide additional processing, such as identifying a confidence that the image has been properly converted into text, and providing word image separation.

Step 74 illustrates identifying an image of a word the OCR process 72 cannot read correctly. This image will be used with the present invention as the read part of a challenge. The words that OCR 72 cannot read correctly may eventually be identified through the operation of the present invention and used as the verify part of the challenge, as will be illustrated below.

Step 76 determines whether a user-generated answer is known for the particular image. In other words, has the image been previously used as a read part of a challenge and, if so, is there sufficient confidence that the image has been correctly identified.

If it is determined that the user-generated answer is not known for the particular image, then the image is distorted for use as the read part of a challenge as illustrated in step 78.

Step 80 illustrates a challenge being created and presented to a user. The challenge includes a read part (the unknown image) and a verify part (a known image).

Step 82 illustrates the processing of the input from the user. It is assumed that the read (or unknown) part of the challenge is correct if the verify (or known) part of the challenge is answered correctly.

Step 84 illustrates the answer to the read part being retained. The same image may be used more than one time as a read part of a challenge before a determination is made as to whether the answer to the image is known.

Referring back to step 76, if it is determined that a user-generated answer is known for a particular image, then that image may be used as the verify part of a challenge.

Step 86 illustrates the distortion of the image which will now be used as a verify part of a challenge. In this example, the image in steps 86 and 88 is distorted differently than the image for the same word in steps 78 and 80. This may be done, for example, to prevent non-human users from circumventing the protection offered by the present invention.

Step 88 illustrates the image being used as the verify part of a challenge. In this embodiment, this particular challenge includes only a verify part, and does not include a read part. In other embodiments, the challenge may include both a read part and a verify part, and the verify part may use an image that was previously unknown, but which now is known.

Figure 8:
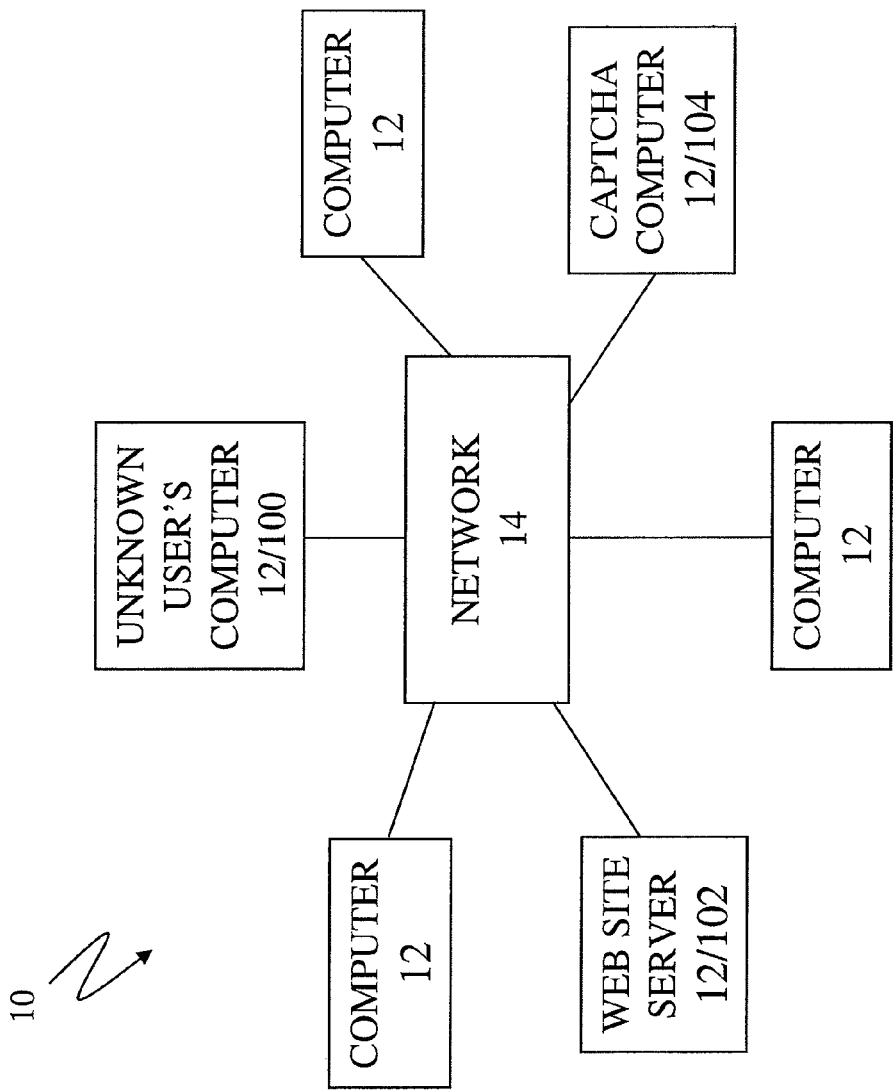
FIG. 8 illustrates another embodiment of a system according to the present invention.

FIG. 8 illustrates another embodiment of a system 10 according to the present invention. In that system, there is a computer 12/100 being used by an unknown user, a computer 12/102 being used as a web server or some other computer or system that the user wishes to access, and a computer 12/104 being used in the operation of the present invention and referred to as a "CAPTCHA computer". The computer 12/100 of an unknown user is attempting to access a web site hosted on the web site server 12/102. The CAPTCHA computer 12/104 holds the images, audio files, or other data used for the challenges. The web site server 12/102 may utilize the present invention by, for example, registering with the CAPTCHA computer 12/104 and adding a few lines of code of its own web site to allow the web site server 12/102 to access both the previously known challenges (the verify part) and the previously unknown challenges (the read part).

The system 10 of the present invention may be used to process large numbers of symbols which OCR technology cannot interpret. As a result, the system 10 of the present invention may be implemented as a large scale system 10 that may, for example, serve a significant portion of all CAPTCHAs throughout the Internet.

Many different embodiment and variations are possible. For example, although one CAPTCHA computer 104 is shown in the illustrated system 10, more than one CAPTCHA computer 104 may be used so as to provide for a more distributed system 10. In other embodiments, there need not be a separate CAPTCHA computer 12/104, and instead the web site server 12/102 may include all of the data necessary to operate according to the present invention and, therefore, the web site server 12/102 is also the CAPTCHA computer 12/104. Furthermore, although the illustrated system 10 shows only one web site server 102 and only one user's computer 100, more than one web site server 12/102 (serving one or more web sites) and more than one user's computer 12/100 (serving one or more users) may be included in the system 10. In practice, the present invention will typically be used with many users 12/100 and many different web sites 12/102.

Many other variations are possible with the present invention. For example, a major problem with current CAPTCHA implementations has been the issue of accessibility for visually impaired users, who cannot read distorted images of text. Although the present invention has generally been described in terms of visual challenges, the present invention also includes applications using non-visual challenges and, thereby, the present invention allows for improved accessibility to the visually impaired. In particular, the present invention may be implemented with an audio or other non-visual alternative, and the non-visual versions may be similar in spirit to the visual one described herein. For example, sound files (e.g., from old radio shows, from recorded speeches, or from TV programs) can be collected, and the words that cannot be understood by speech recognition software will be used for audio challenges. In this way, people solving the audio challenges will also be performing the useful task of captioning archived audio files. This system will improve the overall accessibility of the Web, which currently does not have audio alternatives for CAPTCHAs.

The system 10 disclosed herein will have an additional benefit for accessibility. By improving the process of digitizing printed matter it will help in making those documents more available to the visually impaired, who cannot see the images of the scanned pages but can benefit from those texts being transcribed into electronic form. For example, after the scanned documents are transcribed into ASCII files, visually impaired users can access them through programs (already commonly available) that are able to read ASCII files aloud.

Figure 9:
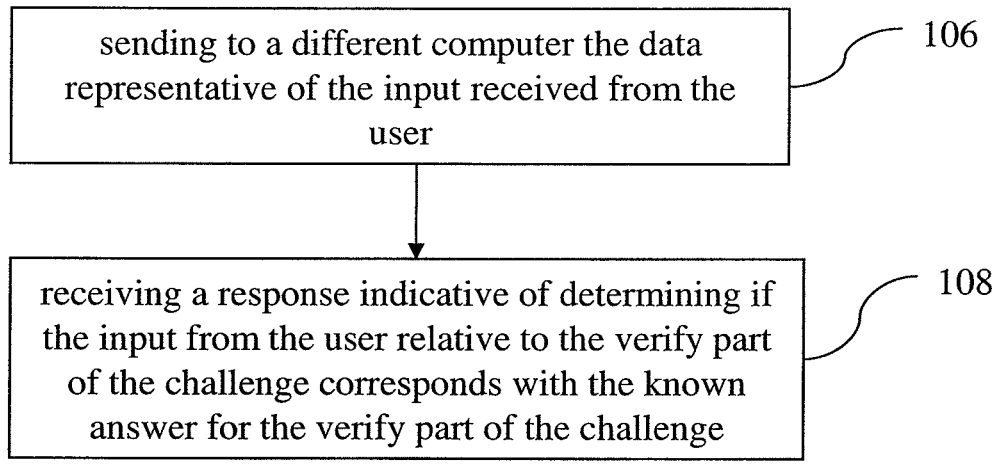
FIG. 9 is a flow chart illustrating one embodiment of the determining step illustrated in FIG. 2.

FIG. 9 is a flow chart illustrating one embodiment of the determining step 36 illustrated in FIG. 2 with regard to the embodiment illustrated in FIG. 8. In particular, although the determining step 36 may be done by the computer 12/102 receiving input from the user, it is also possible for the determining step 36 (FIG. 2) to be performed, at least in part, by a different computer 12/104.

Step 106 includes the computer 12/102 sending to a different computer 12/104 the data representative of the input received from the user 12/100.

Step 108 includes the computer 12/102 receiving a response indicative of determining if the input from the user 12/100 relative to the verify part of the challenge corresponds with the known answer for the verify part of the challenge.

Figure 10:
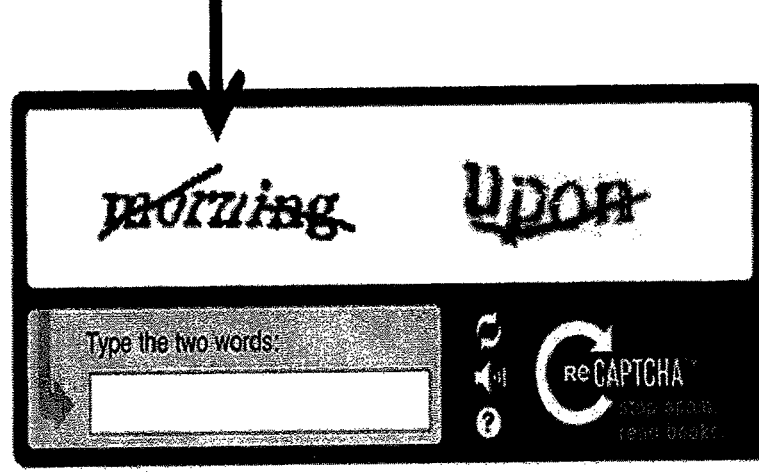
FIG. 10 illustrates one embodiment of the present invention in which images are taken from a document and used as part of a challenge.

FIG. 10 illustrates one embodiment of the operation of the present invention in which images are taken from a document and used as part of a challenge. This embodiment, as well as the other embodiments described herein, is illustrative of the present invention and not limiting.

In summary, a portion of text 110 from a document is used as source material for the challenge. The document may be one which is being scanned into electronic form using OCR so as to be available for use over the Internet or in other electronic applications, or if may be a document for which no use is planned other than as a source for a challenge. In this embodiment, most of the words in the document are scanned effectively and OCR technologies can accurately convert the images of those words into the representative text. At least one word 112, however, is not accurately identified by the OCR process. This word 112 is "morning", although the image of the word 112 is insufficient for OCR to read it properly. That word 112 is identified 114 as not being recognized by the OCR process and, therefore, a good candidate for use as a challenge. The image of the word 114 is distorted with lines and in other ways, and it is presented as a "read" part of a two part "read" and "verify" challenge 116. Because "morning" was not recognized by OCR, the word "upon" was also presented in the challenge as the verify word in order to determine if the user enters the correct answer.

This embodiment will now be described in more detail. We start with an image of a scanned page 110. Two different OCR programs are run on the image 110, and their respective outputs are compared to each other and to an English dictionary. Any word 112 that is deciphered differently by both OCR programs, or which is not in the English dictionary is marked as "suspicious." These words are typically the words that the OCR programs failed to recognize correctly. Each of these suspicious words 112 is then placed on an image, distorted further, and used as part of a CAPTCHA challenge 116 along with another word for which the answer is already known.

In order to lower the probability of automated programs randomly guessing the correct answer, the verify words are normalized in frequency—so, for example, the words "you" and "abridged" have the same probability of being served. Furthermore, to account for human error, every suspicious word is sent to multiple different users. At first, it is displayed as a read word. If a user enters the correct answer to the associated verify word, the user's other answer is recorded as a plausible guess for the read word. Once a word has a plausible guess from the system, it can be used as a verify word in other challenges. Answers to verify words are used to obtain further confidence on previous human guesses. For example, if the first two human guesses agree with each other, the word is marked as correctly recognized and removed from the system 10. In case of discrepancies among human answers, the present invention may send the word to more humans and pick the answer with the most number of "votes," where each human answer counts as a vote, and each OCR guess counts as half of a vote. If no majority exists among the answers, the word is sent to more users, until a majority exists. The details of determining when a read word is correctly recognized can vary, and the standards may be different in different applications depending, for example, on the certainty desired when determining when a read word is correctly recognized.

A post-processing step is applied after all suspicious words in a text have been deciphered by the system. This is necessary because human users make a number of small, but predictable mistakes. Many users type the two words in the challenge without a space, or omit capitalization and punctuation. Further, people with different keyboard layouts often enter unexpected characters—for example, Turkish users frequently enter the character "ı" (no dot on top) instead of "i." It is not also uncommon to see users make typos such as transposing characters. We account for these errors in multiple ways. First, we apply a series of transformations to the user's initial input. For example, if there is no space in the input, we attempt to determine where the space should be by matching one of the words as a substring. Second, when reconciling the multiple user inputs, we take into account typical human errors such as typing in lowercase, transposing characters and replacing one character with another one that is nearby on the keyboard. Third, "book-specific" word frequencies are used to determine the highest likelihood guess for a given word. Again, the extent to which mistakes are accepted can vary and will likely be different for different applications and in situations where different standards apply.

The present invention has been implements as an operational system 10, and this has allowed us to collect a number of findings. The deployment was achieved by offering a free CAPTCHA Web service through http://recaptcha.net. With reference to FIG. 8, a Website 102 that requires protection against automated abuse can obtain a free and secure CAPTCHA implementation. The Website 102 owner adds simple HTML code on their site 102 that displays a CAPTCHA challenge image taken directly from our servers 104. Whenever a user 100 enters the answer to the CAPTCHA challenge, the Website 102 contacts our servers 104 to determine if that answer is correct for the puzzle displayed. The reCAPTCHA service was deployed on May 25, 2007. Since then, over 10,000 Websites have started using it, and by Nov. 25, 2007 the system was receiving over 3 million answers to CAPTCHA challenges every day.

The first finding is that the process of deciphering words using CAPTCHAs can be as accurate as two human transcribers independently typing the text. A random sample of fifty scanned articles from five different years (1860, 1865, 1908, 1935 and 1970) of the New York Times archive (http://nytimes.com) was chosen and manually transcribed for the purpose of estimating the accuracy of identifying unknown words through the present invention on a per-word basis. Each word counted as a "hit" if the algorithm deciphered the entire word correctly, and a "miss" if any of the letters were wrong. From that, the error rate was defined as the number of misses divided by the total number of words. To compare to the error rates of standard OCR, the results of OCR were run through the same process.

The present invention achieves an accuracy of over 99.5% at the word level, whereas the accuracy of standard OCR is only 82%. An accuracy of 99.5% is equivalent to the accuracy of using "key and verify" transcription techniques in which two professional human transcribers independently type the data. As an anecdote, the manual transcriptions of the articles (that were collected as "ground truth" in order to measure the accuracy of the present invention) originally contained more errors than those made by the present invention. The fact that the present invention can achieve an accuracy comparable to two independent humans is counterintuitive for two reasons. First, human transcribers can make use of context (words immediately before and after), whereas words presented by the present invention are shown by themselves. Second, only "suspicious" words are used with the present invention, meaning that the use of two different OCR programs and a dictionary is enough to determine with high probability which words OCR cannot decipher correctly.

Another finding is that the present invention constitutes a viable mechanism to obtain large amounts of human mental effort. After only six months of running the system 10 according to the present invention, humans had solved over 250,000,000 CAPTCHAs, amounting to over 150,000,000 suspicious words correctly deciphered. Assuming 100,000 words per book, this is equivalent to over 7,500 books manually transcribed (approximately 20% of the words in a book are marked as suspicious by our algorithm). The system 10 continues to grow in popularity, and the rate of transcription is currently at over 1.5 million suspicious words per day—approximately 75 books per day. Achieving this rate through conventional means would require a workforce of over 500 people deciphering words 40 hours per week.

The present invention offers several additional advantages. First, it is more secure than the conventional CAPTCHAs that generate their own randomly distorted characters. It is possible to build algorithms that can read the distorted text generated by most prior art CAPTCHAs. See, for example, K. Chellapilla, P. Y. Simard. Using Machine Learning to Break Visual Human Interaction Proofs (HIPs). Eighteenth Annual Conference on Neural Information Processing Systems, NIPS 2004; G. Mori, J. Malik. Recognizing Objects in Adversarial Clutter: Breaking a Visual CAPTCHA. In IEEE Conference on Computer Vision and Pattern Recognition, CVPR 2003. Pages 134-144; and A. Thayananthan, B. Stenger, P. H. S. Torr, R. Cipolla: Shape Context and Chamfer Matching in Cluttered Scenes. In IEEE Conference on Computer Vision and Pattern Recognition, CVPR 2003. Pages 127-133. One major reason for this is that the artificial distortions of characters in prior art CAPTCHAs come from a limited distribution of possible transformations. Therefore, it is feasible to build machine learning algorithms that, after some training, can recognize the distorted characters. On the other hand, the words displayed by the present invention have two types of distortions. First, and most importantly, there are natural distortions that come from the underlying texts having faded through time, and from noise in the scanning process. Second, there are artificial transformations similar to those used by prior art CAPTCHAs. Because of this, the distribution of distortions in present invention is significantly less limited, and harder to capture with machine learning algorithms. Additionally, the present invention only displays words for which OCR likely failed. In essence, these are the "hardest" words for computers to decipher and, therefore, are the most likely to effectively distinguish between human and non-human users.

The second reason for Websites adopting the present invention is that, although the present invention presents two words instead of just one, it takes no more time for users to solve a challenge in the present invention than to solve a prior art CAPTCHA. Prior art CAPTCHAs present six to eight randomly chosen characters, which take equally long to type as two English words.

As described above, the present invention may also be implemented as an audio challenge for visually impaired individuals. Blind people surf the Web using "screen readers," which are programs that read the contents of the screen to the user. Since screen readers are themselves programs, by definition they cannot read the prior art CAPTCHA to their user. Therefore prior art CAPTCHAs based on distorted words block visually impaired individuals from freely navigating the Web. Whereas most implementations of prior art CAPTCHA ignore this issue, the present invention allows the user to hear an audio challenge. For example, the audio challenge may be a sound clip with eight randomly distorted digits, although more or fewer digits may also be used. These digits may come from a library of many digits recorded by specifically for this purpose, or from other audio sources in a manner similar to using documents as a source for visual challenge material. The audio CAPTCHA according to the present invention may also be implemented so as to also provide for the transcription of speech. In the same way that visual CAPTCHAs can be used to transcribe text, audio CAPTCHAs could be used to transcribe speech. Although automated voice recognition technology has advanced significantly, the only way to obtain near perfect accuracy is to use humans.

The results presented here are a mere proof of concept of a more general idea: "wasted" human processing power can be harnessed to solve problems that computers cannot yet solve.

In previous work it has been shown that such processing power can be harnessed through computer games: people play these games and, as a result, collectively perform tasks that computers cannot yet perform. See, for example, L. von Ahn. Games With A Purpose. In IEEE Computer Magazine, June 2006. Pages 96-98; L. von Ahn, L. Dabbish. Labeling Images with a Computer Game. In ACM Conference on Human Factors in Computing Systems, CHI 2004. Pages 319-326; and L. von Ahn, R. Liu, M. Blum. Peekaboom: A Game for Locating Objects in Images. In ACM Conference on Human Factors in Computing Systems, CHI 2006. Pages 55-64. Here we have shown that CAPTCHAs constitute another avenue for "reusing" wasted computational power. A related, but different line of work is ASIRRA (J. Elson, J. Douceur, J. Howell. Asirra: A CAPTCHA that Exploits Interest-Aligned Manual Image Categorization. In ACM Conference on Computer and Communications Security, CCS 2007), which has shown that CAPTCHAs can be used for humanitarian purposes. In their system, pictures of cats and dogs are presented to the user, who has to determine which ones are cats and which ones are dogs. The humanitarian twist is that the pictures come from animal shelters: if a user likes one of the cats or dogs, they can adopt them.

Although the present invention has generally been described in terms of specific embodiments and implementations, the present invention is applicable to a wide range of other variations and embodiments. Those and other variations and modifications of the present invention are possible and contemplated, and it is intended that the foregoing specification and the following claims cover such modifications and variations.

The invention claimed is:

1. A method of controlling access to a system, comprising:
    generating a challenge to a user of the system, wherein the challenge includes a plurality of parts including:
        at least one verify part of the challenge for which an answer is known; and
        at least one read part of the challenge for which an answer is not known;
    prompting the user to solve the challenge including the verify part of the challenge and the read part of the challenge without identifying to the user which of the parts is the verify part and which of the parts is the read part;
    receiving input from the user;
    determining if the input from the user relative to the verify part of the challenge corresponds with the known answer for the verify part of the challenge;
    identifying the input from the user relative to the read part of the challenge as an answer to the read part of the challenge, if the input from the user relative to the verify part of the challenge corresponds with the known answer for the verify part of the challenge; and
    allowing the user to access the computer system if the input from the user relative to the verify part of the challenge corresponds with known answer for the verify part of the challenge and without determining if the input from the user relative to the read part of the challenge is correct.

2. The method of claim 1, wherein determining if the input from the user relative to the verify part of the challenge corresponds with the known answer for the verify part of the challenge includes:
    sending to a different computer the data representative of the input received from the user; and
    receiving a response indicative of determining if the input from the user relative to the verify part of the challenge corresponds with the known answer for the verify part of the challenge.

3. The method of claim 1, further comprising modifying at least one perceptible characteristic of at least one of the verify part of the challenge and the read part of the challenge.

4. The method of claim 1, wherein the challenge is an image of a plurality of characters.

5. The method of claim 1, further comprising before generating a challenge:
    creating an electronic representation of an image of a document;
    converting the electronic representation of the image of the document into an electronic representation of characters of the document;
    producing a measure representative of a confidence that the electronic representation of the characters of the document accurately corresponds to the document; and
    designating at least one portion of the electronic representation of the characters of the document as not having a known answer based on the measurement representative of the confidence that the electronic representation of the characters of the document accurately corresponds to the document.

6. The method of claim 5, further comprising after producing a measure: designating at least one portion of the electronic representation of the characters of the document as having a known answer based on the measure representative of the confidence that the electronic representation of the characters of the document accurately corresponds to the document.

7. The method of claim 5, further comprising after identifying the input from the user relative to the read part of the challenge as an answer to the read part of the challenge if the input from the user relative to the verify part of the challenge corresponds with the known answer for the verify part of the challenge:
    providing the input from the user relative to the read part of the challenge as the electronic representation of the corresponding image of the document; and
    designating image of the document corresponding to the input from the user as having a known answer.

8. The method of claim 1, wherein the challenge includes an audible recording.

9. The method of claim 1, wherein the read part of the challenge is presented before the verify part of the challenge.

10. The method of claim 1, wherein the verify part of the challenge is presented before the read part of the challenge.

11. The method of claim 1, wherein at least the verify part of the challenge is distorted when presented to the user.

12. The method of claim 1, wherein at least the read part of the challenge is distorted when presented to the user.

13. A computer-readable storage device having recorded and stored thereon instructions which, when executed by a processor, cause the processor to perform operations of:
    generating a challenge to a user of a computer system, wherein the challenge includes a plurality of parts including:
        at least one verify part of the challenge for which an answer is known; and
        at least one read part of the challenge for which an answer is not known;
    prompting the user to solve the challenge including the verify part of the challenge and the read part of the challenge without identifying to the user which of the parts is the verify part and which of the parts is the read part;

receiving input from the user;

determining if the input from the user relative to the verify part of the challenge corresponds with the known answer for the verify part of the challenge;

identifying the input from the user relative to the read part of the challenge as an answer to the read part of the challenge, if the input from the user relative to the verify part of the challenge corresponds with the known answer for the verify part of the challenge; and allowing the user to access the computer system if the input from the user relative to the verify part of the challenge corresponds with known answer for the verify part of the challenge and without determining if the input from the user relative to the read part of the challenge is correct.

14. The computer-readable storage device of claim 13, further comprising before generating a challenge:

creating an electronic representation of an image of a document;

converting the electronic representation of the image of the document into an electronic representation of characters of the document; and producing a measure representative of a confidence that the electronic representation of the characters of the document accurately corresponds to the document.

15. The computer-readable storage device of claim 14, further comprising after producing a measure: designating at least one portion of the electronic representation of the characters of the document as having a known answer based on the measure representative of the confidence that the electronic representation of the characters of the document accurately corresponds to the document.

16. The computer-readable storage device of claim 14, further comprising after identifying the input from the user relative to the read part of the challenge as an answer to the read part of the challenge if the input from the user relative to the verify part of the challenge corresponds with the known answer for the verify part of the challenge:

providing the input from the user relative to the read part of the challenge as the electronic representation of the corresponding image of the document; and designating image of the document corresponding to the input from the user as having a known answer.

17. The computer-readable storage device of claim 13, wherein at least the verify part of the challenge is distorted when presented to the user.

18. The computer-readable storage device of claim 13, wherein at least the read part of the challenge is distorted when presented to the user.

19. A system comprising:

a network;

a plurality of computers, wherein:

at least one of the computers is being used by a user attempting to gain access to another computer in the system;

at least one of the computers includes a processor and a memory, and wherein the memory includes computer-readable instructions which, when executed by the processor, cause the processor to perform operations of:

generating a challenge to the computer being used by the user, wherein the challenge includes a plurality of parts including:

at least one verify part of the challenge for which an answer is known; and at least one read part of the challenge for which an answer is not known;

prompting the computer of the user to solve the challenge including the verify part of the challenge and the read part of the challenge without identifying to the user which of the parts is the verify part and which of the parts is the read part;

receiving input from the computer of the user;

determining if the input from the computer of the user relative to the verify part of the challenge corresponds with the known answer for the verify part of the challenge;

identifying the input from the computer of the user relative to the read part of the challenge as an answer to the read part of the challenge, if the input from the computer of the user relative to the verify part of the challenge corresponds with the known answer for the verify part of the challenge; and allowing the user to access the computer if the input from the user relative to the verify part of the challenge corresponds with known answer for the verify part of the challenge and without determining if the input from the user relative to the read part of the challenge is correct.

20. The system of claim 19, further comprising a computer including a processor and a memory, wherein the memory includes computer-readable instructions which, when executed by the processor, cause the processor to perform operations of:

creating an electronic representation of an image of a document;

converting the electronic representation of the image of the document into an electronic representation of characters of the document;

producing a measure representative of a confidence that the electronic representation of the characters of the document accurately corresponds to the document; and designating at least one portion of the electronic representation of the characters of the document as not having a known answer based on the measurement representative of the confidence that the electronic representation of the characters of the document accurately corresponds to the document.

21. The system of claim 20, wherein creating, converting, producing, and designating are performed before generating a challenge.

22. The system of claim 20, wherein at least one of the computers includes a processor and a memory, and wherein the memory includes computer-readable instructions which, when executed by the processor, cause the processor to perform operations of:

providing the input from the computer of the user relative to the read part of the challenge as the electronic representation of the corresponding image of the document; and designating image of the document corresponding to the input from the computer of the user as having a known answer.

23. The system of claim 22, wherein providing and designating are performed after identifying the input from the computer of the user relative to the read part of the challenge as an answer to the read part of the challenge if the input from the computer of the user relative to the verify part of the challenge corresponds with the known answer for the verify part of the challenge.

24. The system of claim 19, wherein at least the verify part of the challenge is distorted when presented to the user.

25. The system of claim 19, wherein at least the read part of the challenge is distorted when presented to the user.

* * * * *